March 26, 1963 R. M. HUBBARD 3,083,334

MAGNETIC AMPLIFIERS

Original Filed July 22, 1959 2 Sheets-Sheet 1

INVENTOR.
ROBERT M. HUBBARD

BY

ATTORNEY

March 26, 1963 R. M. HUBBARD 3,083,334

MAGNETIC AMPLIFIERS

Original Filed July 22, 1959 2 Sheets-Sheet 2

INVENTOR.
ROBERT M. HUBBARD

BY K. W. Thomas

ATTORNEY

United States Patent Office 3,083,334
Patented Mar. 26, 1963

3,083,334

MAGNETIC AMPLIFIERS

Robert M. Hubbard, 532 Scenic Way, Kent, Wash.

Continuation of application Ser. No. 828,750, July 22, 1959. This application Dec. 11, 1961, Ser. No. 159,823
2 Claims. (Cl. 323—89)

This invention relates to magnetic amplifiers, and more particularly, to new and improved magnetic amplifiers of the self-saturating type.

The subject application is a continuatoin application of patent application Serial No. 828,750, filed July 22, 1959, now abandoned, and entitled "Magnetic Amplifiers"; and the subject application is related to patent application Serial No. 828,783, filed July 22, 1959, and entitled "Time Delay Circuits," and is related to patent application Serial 828,749, filed July 22, 1959, and entitled "Full-Wave Magnetic Amplifiers" (now United States Patent No. 3,002,145).

Conventional magnetic amplifiers of the self-saturating type are characterized by having a load circuit in which the load is in series circuit relationship with the load winding, the self-saturating rectifier, and a source of alternating voltage. Although this type of prior art magnetic amplifier has relatively high efficiency, it has several limitations. For instance, although the average voltage across the gate or load winding is proportional to the magnitude of the input control signal to the magnetic amplifier, the voltage appearing across the load is directly affected by any changes in the magnitude of the supply voltage to the magnetic amplifier since, as hereinbefore mentioned, the source of supply voltage is in series circuit relationship with the load winding and the load.

In addition, in the conventional self-saturating magnetic amplifier, such as Logan's self-saturating magnetic amplifier, the magnitude of the voltage across the load decreases with an increase in magnitude of the input control signal unless separate biasing means is provided. However, when separate biasing means is provided, any change in the magnitude of the biasing signal effects a change in the magnitude of the voltage across the load connected to the amplifier, thus effecting drift. If two of these conventional self-saturating amplifiers are connected in cascade to establish two stages, the second stage must also be provided with separate biasing means in order for the output signal from the second stage to increase in magnitude with an increase in the magnitude of the input signal to the first stage. Here again the introduction of biasing means into the second stage causes the amplifier to drift.

A further disadvantage of conventional self-saturating magnetic amplifier circuitry is that when two full-wave stages are connected in cascade, they are normally coupled by a power wasting forcing resistance to insure fast response in the second stage. Also, normally the highly peaked output voltage wave form of the first stage effects rectifier unblocking in the second stage unless some decoupling interstage filtering is utilized. This filtering, of course, lengthens the response time of the amplifier.

The most important defficiency of two half-wave conventional self-saturating magnetic amplifiers when connected in cascade is the gate circuit loading of the second stage during the second stage gating half-cycle. During this gating half-cycle the induced voltage effected in the second stage control winding adds to the induced voltage in the first stage load winding to oppose the supply voltage and thereby cause the first stage self-saturating rectifier to conduct when in reality it should be blocking. In other words, if the first stage self-saturating rectifier fails to perform its function of blocking, the control circuit of the first stage offers a low impedance reflected to the gate circuit of the second stage and therefore appreciable current flows to the second stage load before the gate winding of the second stage effects a saturation of its associated core, and thus the difference current to the load before and after saturation of this core is relatively small. Commonly a resistance is added in series with the second stage control winding to alleviate, but never correct, this situation.

In a conventional full-wave self-saturating magnetic amplifier having series connected control windings, one of the cores of the magnetic amplifier is being reset while the other core of the magnetic amplifier is being gated. Such being the case a voltage is reflected back into the control circuit by the action of the core being gated, to thus effect a feedback action in which this reflected voltage effects the magnitude of the control signal being applied to the core being reset. This results in an increase in the response time of the magnetic amplifier.

An important limitation on the design of half-wave stages in cascade when utilizing conventional self-saturating magnetic amplifiers is imposed by the fact that the impedance presented by the control winding of the second stage must be small compared to the unsaturated impedance of the gate winding of the first stage in order to obtain a good dynamic range for the magnetic amplifier stages. For instance, if the impedance presented by the control winding of the second stage is substantially equal to the unsaturated impedance of the gate winding of the first stage, there will only be a two-to-one change in the magnitude of the voltage appearing across the control winding of the second stage in going from the nonsaturated to the saturated state in the first stage. This, of course, is not good dynamic range.

A conventional self-saturating magnetic amplifier having positive feedback effects an output voltage with no control signal input to the amplifier. On the other hand, a conventional self-saturating magnetic amplifier having a large amount of negative feedback effects a cut-off voltage across the load with no control signal input. Oftentimes, it is desirable to attain just the opposite effect, that is with positive feedback to have the output voltage of the magnetic amplifier at cut-off with no control signal input and with negative feedback to have the output voltage of the magnetic amplifier at the saturated value with no control signal input.

Therefore, an object of this invention is to provide for so coupling a load to the gate circuit of a magnetic amplifier that the voltage across the load is substantially directly proportional and substantially equal to the gate voltage to thus effect an efficient transfer of the gate voltage to the load in a manner that the voltage across the load is substantially independent of the magnitude of the supply voltage to the magnetic amplifier, to thereby render the magnitude of the load voltage proportional only to the control signal applied to the magnetic amplifier.

Another object of this invention is to provide for rendering the load voltage of a magnetic amplifier substantially directly proportional to its input control signal, that is, an increase in the magnitude of the control effects an increase in the magnitude of the load voltage, without the aid of biasing means, to thereby eliminate the undesired effect of biasing which changes the magnitude of the load voltage in accordance with the magnitude of the biasing signal.

A further object of this invention is to provide for eliminating biasing means for the second stage of a two-stage magnetic amplifier, to thereby render the magnitude of the load voltage of the second stage independent of any such biasing means.

Still another object of this invention is to provide for increasing the signal transfer efficiency between the first and second stage of a two-stage magnetic amplifier, by connecting the control circuit of the second stage in parallel circuit relationship with the gate circuit of the first stage, thereby eliminating the need for the conventional coupling.

A still further object of this invention is to provide for substantially eliminating loading of the gate circuit of the second stage during its gating half-cycle by blocking the flow of current through the reset winding of the second stage during this gating half-cycle.

Another object of this invention is to provide for obtaining half-cycle response in the second stage of a full-wave two-stage magnetic amplifier, by providing complete isolation between the reset windings of the second stage.

A further object of this invention is to provide for simplifying the design problems in those magnetic amplifiers exhibiting half-cycle response in the second stage by eliminating the requirement that the impedance of the second stage control windings be low compared to the unsaturated impedance of the first stage gate winding.

Still another object of this invention is to provide a positive feedback action in a magnetic amplifier that also effects a biasing effect so that with no control signal input to the magnetic amplifier the output voltage of the magnetic amplifier can be at cut-off.

Another object of this invention is to provide a negative feedback action in a magnetic amplifier that also effects a biasing effect so that with no control signal input to the magnetic amplifier the output voltage of the magnetic amplifier can remain at the saturated value.

Other objects of this invention will become apparent from the following description when taken in conjunction with the accompanying drawings in which.

Figure 1:
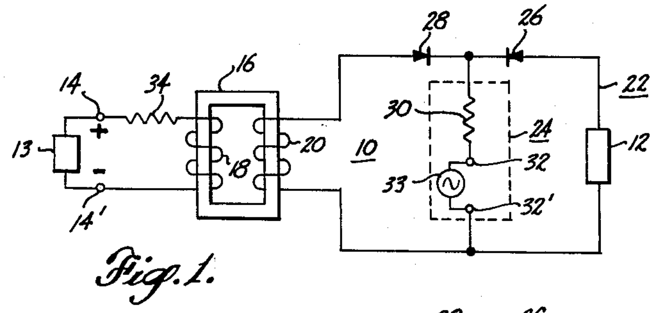
FIG. 1 is a schematic diagram of a single-stage half-wave magnetic amplifier illustrating one embodiment of this invention.

Referring to FIG. 1 there is illustrated a single stage half-wave magnetic amplifier 10 embodying teachings of this invention. In operation, the magnetic amplifier 10 effects a half-wave voltage across a load 12, the magnitude of which is only proportional to the magnitude of the output voltage of a control source 13 which is connected to control terminals 14 and 14'. In practice, the control source can either effect a direct-current voltage or an alternating voltage, however, the polarity of the control voltage during the reset half-cycle must be as indicated in FIG. 1. As shown, the magnetic amplifier 10 comprises a magnetic core member 16, a reset winding 18 and a gate winding 20 disposed in inductive relationship with the magnetic core member 16.

In accordance with this invention, a parallel circuit 22 is connected in series circuit relationship with a current source 24, one branch of the parallel circuit 22 including the load 12 and a rectifier 26 and the other branch of the parallel circuit 22 including the gate winding 20 and a rectifier 28. In this instance, the current source 24 comprises a current-limiting resistor 30 and supply terminals 32 and 32' to which is connected a source 33 of alternating voltage.

As illustrated, the rectifiers 26 and 28 are so poled as to permit, only during alternate half-cycles of the voltage applied to the supply terminals 32 and 32', the flow of current through both branches of the parallel circuit 22. Specifically, current flows through both branches of the parallel circuit 22 only during those alternate half-cycles of operation when the supply terminal 32' is at a positive polarity with respect to the supply terminal 32. During the other alternate half-cycles of operation when the supply terminal 32 is at a positive polarity with respect to the supply terminal 32', the rectifiers 26 and 28 block the flow of current through both branches of the parallel circuit 22.

In order to reset the magnetic core member 16, during those half-cycles of operation when the supply terminal 32 is at a positive polarity with respect to the supply terminal 32', the reset winding 18 is connected to the control terminals 14 and 14' through a current-limiting resistor 34 which in operation functions to cause the control circuit, including the reset winding 18 and the resistor 34, to offer a high impedance during that portion of the operation when the magnetic core member 16 is being gated.

In operation, the voltage across the load 12 is substantially directly proportional to and substantially equal to the gate voltage appearing across the gate winding 20, to thus effect an efficient transfer of the gate voltage to the load 12. Further, the magnitude of the voltage across the load 12 is substantially independent of the magnitude of the supply voltage across the supply terminals 32 and 32'. Therefore, the magnitude of the voltage across the load is proportional only to the magnitude of the input control voltage applied to the control terminal 14 and 14'. It is also to be noted that an increase in the magnitude of the input control signal applied to the control terminals 14 and 14' effects an increase in the magnitude of the voltage appearing across the load 12. For instance, with the supply terminal 32' at a positive polarity with respect to the supply terminal 32, current flows from the supply terminal 32' through both branches of the parallel circuit 22 and the current-limiting resistor 30, to the supply terminal 32, to thereby effect saturation of the magnetic core member 16. Until saturation, substantially all of the voltage appearing across the supply terminals 32 and 32' appears across the gate winding 20 and the load 12. However, upon saturation of the magnetic core member 16, substantially all of the voltage across the supply terminals 32 and 32' then appears across the current-limiting resistor 30. The proportion of the voltage appearing across the supply terminals 32 and 32' that appears across the load 12 is determined by the flux level to which the magnetic core member 16 has been reset during the previous half-cycle by the action of the input control signal applied to the control terminals 14 and 14'. Therefore, if the magnitude of the input control signal is increased, the magnetic core member 16 is reset to a lower flux level and magnetizing current must flow from the supply terminal 32' through the gate winding 20 for a longer portion of this half-cycle of operation and, therefore, the magnitude of the average voltage across the load 12 is increased.

Figure 2:
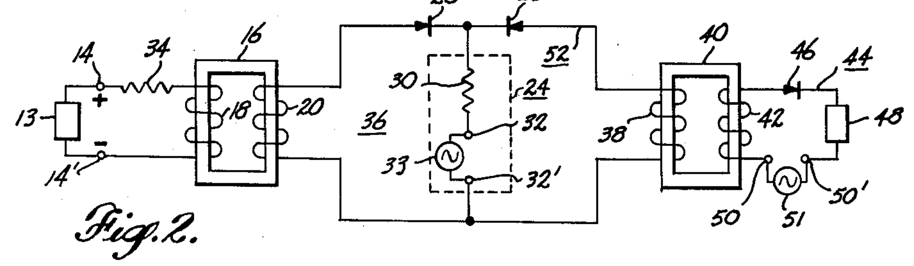
FIG. 2 is a schematic diagram of two half-wave magnetic amplifiers connected in cascade illustrating another embodiment of this invention.

Referring to FIG. 2 there is shown a two-stage half-wave magnetic amplifier 36 in which like components of FIGS. 1 and 2 have been given the same reference characters. In FIG. 2 the load 12 of FIG. 1 becomes a reset winding 38 in the second stage of the magnetic amplifier 36. Thus, the second stage of the magnetic amplifier 36 comprises the reset winding 38 which is disposed in inductive relationship with a magnetic core member 40, the rectifier 26, a gate winding 42 also disposed in inductive relationship with the magnetic core member 40, and circuit means 44 for effecting a gating of the magnetic core member 40. On the other hand, the first stage of the magnetic amplifier 36 includes the magnetic core member 16, the reset and gate windings 18 and 20, respectively, and the rectifier 28.

As illustrated, the circuit means 44 for effecting a gating of the magnetic core member 40 includes a rectifier 46, a load 48, and supply terminals 50 and 50′ adapted to be connected to a source 51 of alternating voltage which is of the same frequency as the source 33 of alternating voltage connected to the supply terminals 32 and 32′. In operation, the supply voltage applied to the supply terminals 50 and 50′ must be so synchronized with the supply voltage applied to the supply terminals 32 and 32′ that when the supply terminal 32 is at a positive polarity with respect to the supply terminal 32′, the supply terminal 50 is at a positive polarity with respect to the supply terminal 50′.

The operation of the apparatus and circuits of FIG. 2 will now be described. During the alternate half-cycles of operation when the supply terminal 32′ is at a positive polarity with respect to the supply terminal 32 and the supply terminal 50′ is at a positive polarity with respect to the supply terminal 50, current flows from the supply terminal 32′ through a parallel circuit 52, one branch of which includes the gate winding 20 and the rectifier 28 and the other branch of which includes the reset winding 38 and the rectifier 26, and the current-limiting resistor 30, to the supply terminal 32, to thereby gate the magnetic core member 16 and reset the magnetic core member 40. During this same half-cycle of operation the rectifier 46 blocks the flow of current from the supply terminal 50′ through the load 48 and the gate winding 42.

During the next half-cycle of operation, when the supply terminal 32 is at a positive polarity with respect to the supply terminal 32′ and the supply terminal 50 is at a positive polarity with respect to the supply terminal 50′, control current flows from the control terminal 14 through the current-limiting resistor 34 and the reset winding 18 to the control terminal 14′, to thereby effect a resetting of the magnetic core member 16 in accordance with the magnitude of the input control signal applied to the control terminals 14 and 14′. Simultaneously, current flows from the supply terminal 50 through the gate winding 42, the rectifier 46 in the forward direction, and the load 48, to the supply terminal 50′, to thereby effect a voltage across the load 48 in accordance with the magnitude of the input control signal applied to the control terminals 14 and 14′ during the previous reset half-cycle. During this same half-cycle of operation the rectifiers 26 and 28 block the flow of current through both branches of the parallel circuit 52.

It is to be noted that in the magnetic amplifier 36, loading of the gate circuit of the second stage is substantially eliminated since the rectifier 26 blocks the flow of current through the reset winding 38 during the half-cycle of operation when the magnetic core member 40 is being gated. Thus, in order to prevent loading of the gate circuit of the second stage of the magnetic amplifier 36, it is only necessary for the supply voltage applied to the supply terminals 32 and 32′ to exceed the magnitude of the voltage induced across the reset winding 38 during the half-cycle of operation when the magnetic core member 40 is being gated.

Figure 3:
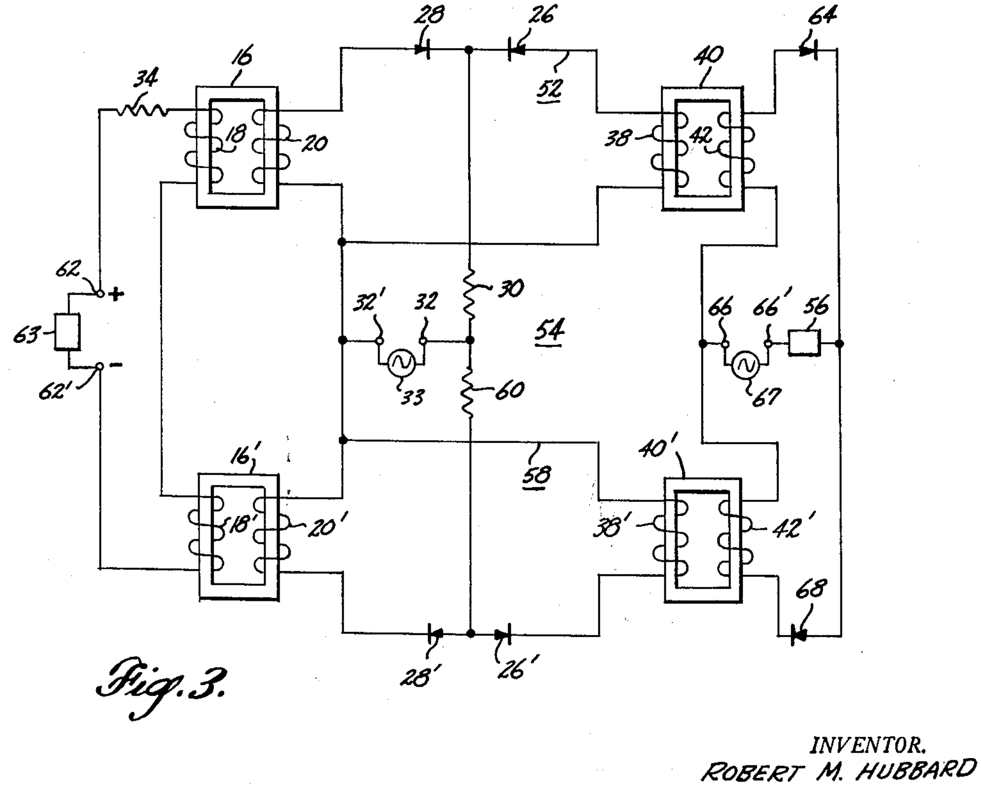
FIG. 3 is a schematic diagram of a two-stage full-wave magnetic amplifier, having a non-reversible polarity input control signal, illustrating a further embodiment of this invention.

Referring to FIG. 3 there is illustrated a full-wave magnetic amplifier 54 adapted to be controlled from a non-reversible polarity direct-current input control voltage and embodying further teachings of this invention. Like components of FIGS. 2 and 3 have been given the same reference characters. Since the magnetic amplifier 54 of FIG. 3 comprises, in essence, two of the magnetic amplifiers 36 of FIG. 2 connected to effect full-wave alternating voltage across a load 56, the greater part of the lower portion of the magnetic amplifier 54 has been given the same reference characters as the upper portion of the magnetic amplifier 54, except that the reference characters applied to the lower portion of the magnetic amplifiers 54 have been given a prime.

In order to effect a flow of current through a parallel circuit 58, one branch of which includes the gate winding 20′ and the rectifier 28′ and the other branch of which includes the reset winding 38′ and the rectifier 26′, during the alternate half-cycles of operation that the rectifiers 26 and 28 of the parallel circuit 52 are preventing the flow of current through the parallel circuit 52, the parallel circuit 58 is connected in series circuit relationship with the supply terminals 32 and 32′ through a current-limiting resistor 60.

As shown, the reset winding 18 and the reset winding 18′ are connected in series circuit relationship with the current-limiting resistor 34, the series circuit being connected to control terminal 62 and 62′ which have connected thereto a source 63 of direct-current input control voltage of non-reversible polarity, to thus alternately effect a resetting of the magnetic core member 16 and 16′ in accordance with the magnitude of the control voltage applied to the control terminals 62 and 62′. On the other hand, in order to alternately effect a gating of magnetic core members 40 and 40′, the gate winding 42 is connected in series circuit relationship with the load 56 and with a rectifier 64 across supply terminals 66 and 66′, which have connected thereto an alternating supply source 67 of the same frequency as the alternating supply source 33, the alternating voltage applied to the supply terminals 66 and 66′ being synchronized with respect to the alternating voltage applied to the supply terminals 32 and 32′ so that when supply terminal 32′ is at a positive polarity with respect to the supply terminal 32, the supply terminal 66′ is likewise at a positive polarity with respect to the supply terminal 66. In like manner, the gate winding 42′ is connected in series circuit relationship with the load 56 and with a rectifier 68 across the supply terminals 66 and 66′.

The operation of the magnetic amplifier 54 of FIG. 3 will now be described. During alternate half-cycles of the supply voltage applied to the supply terminals 32 and 32′ and to the supply terminals 66 and 66′, the magnetic core members 16 and 40′ are gated and the magnetic core members 16′ and 40 are reset, to thus effect a flow of current from the supply terminal 66′ through the load 56, the rectifier 68 in the forward direction, and the gate winding 42′, to the supply terminal 66. During the other alternate half-cycles of the supply voltage applied to the supply terminals 32 and 32′ and to the supply terminals 66 and 66′, the magnetic core members 16′ and 40 are gated and the magnetic core members 16 and 40′ are reset, to thereby effect a flow of current from the supply terminal 66 through the gate winding 42, the rectifier 64 in the forward direction, and the load 56, to the supply terminal 66′.

Specifically, during that half-cycle of operation when the supply terminal 32′ is at a positive polarity with respect to the supply terminal 32 and the supply terminal 66′ is at a positive polarity with respect to the supply terminal 66, current flows from the supply terminal 32′ through both branches of the parallel circuit 52, and the current-limiting resistor 30, to the supply terminal 32, to thereby effect a gating of the magnetic core member 16 and a resetting of the magnetic core member 40. Simultaneously, control current flows from the control terminal 62 through the current-limiting resistor 34 and the reset windings 18 and 18′ to the control terminal 62′, to thus effect a resetting of the magnetic core member 16′. During this same half-cycle of operation, current flows from the supply terminal 66′ through the load 56, the rectifier 68 in the forward direction, and the gate winding 42′, to the supply terminal 66, to thereby gate the magnetic core member 40′. The rectifier 64 during this half-cycle of operation prevents the flow of current through the gate winding 42.

During the next half-cycle of operation when the supply terminal 32 is at a positive polarity with respect to the supply terminal 32′ and the supply terminal 66 is at a positive polarity with respect to the supply terminal 66′, current flows from the supply terminal 32 through the current-limiting resistor 60 and both branches of the parallel circuit 58, to the supply terminal 32', to thus gate the magnetic core member 16' and reset the magnetic core member 40'. During this same half-cycle of operation control current flows from the control terminal 62 through the current-limiting resistor 34, the reset windings 18 and 18', to the control terminal 62' to thus effect a resetting of the magnetic core member 16. Simultaneously, current flows from the supply terminal 66 through the gate winding 42, the rectifier 64 in the forward direction, and the load 56, to the supply terminal 66', to thereby effect a gating of the magnetic core member 40. The rectifier 68 prevents the flow of current through the gate winding 42' during this latter half-cycle of operation.

The magnetic amplifier 54 of FIG. 3 has the same advantages as the magnetic amplifier 36 of FIG. 2 and in addition thereto provides half-cycle response in the second stage which includes the magnetic core members 40 and 40', since isolation is provided between the reset windings 38 and 38'. Further, neither a forcing resistor (not shown) nor interstage filtering (not shown) is required between the two stages of the magnetic amplifier 54.

Figures 4, 5, 6A, 6B:
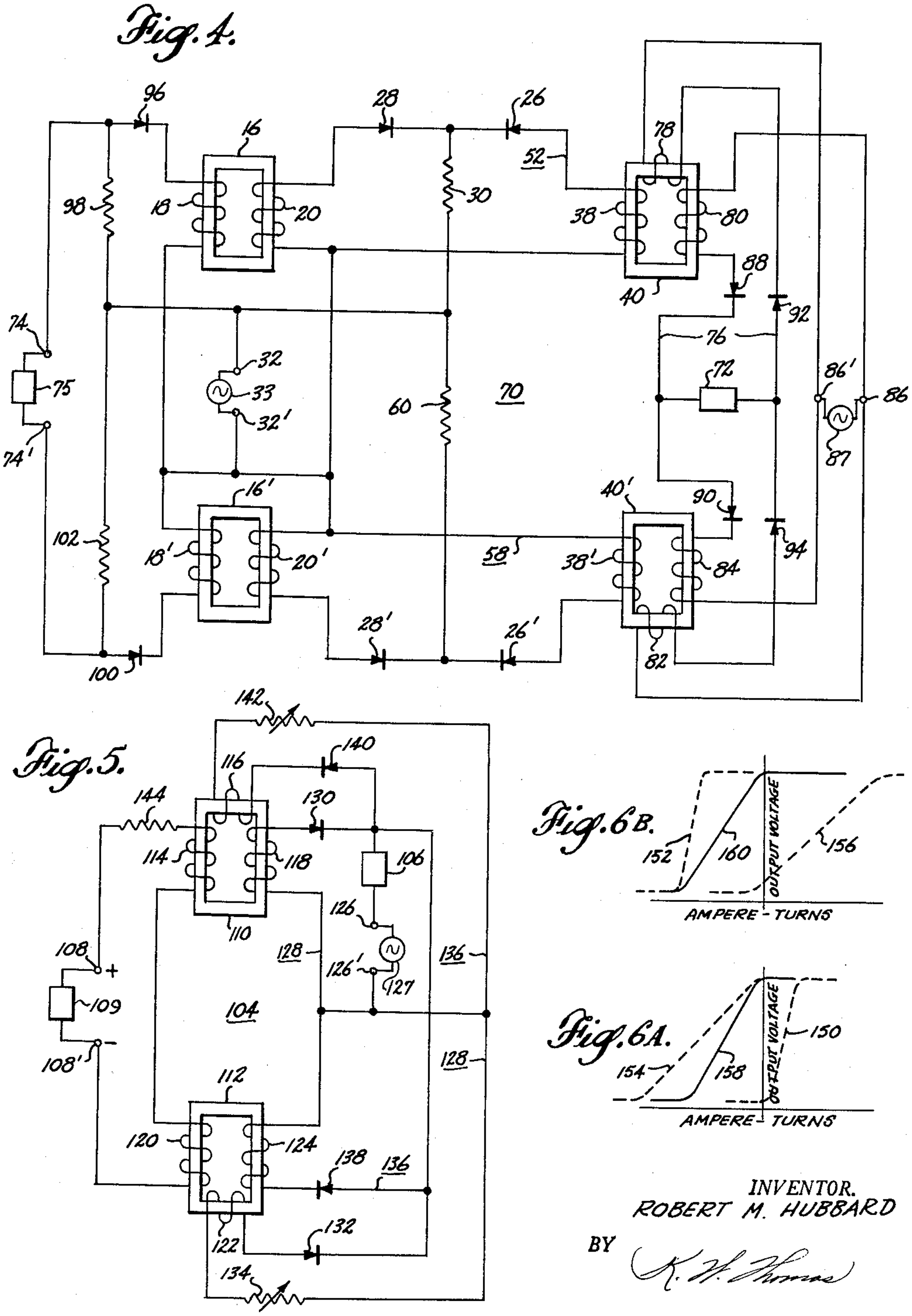
FIG. 4 is a schematic diagram of a two-stage half-wave magnetic amplifier, having a differential input control signal, illustrating still another embodiment of this invention.
FIG. 5 is a schematic diagram of still another embodiment of this invention in which feedback is provided.
FIGS. 6A and 6B are graphs illustrating the feedback action of a conventional self-saturating magnetic amplifier and the magnetic amplifier shown in FIG. 5, respectively.

Referring to FIG. 4 there is illustrated a half-wave magnetic amplifier 70 comprising two stages for effecting a half-wave voltage across a load 72 in accordance with a direct-current differential control voltage applied to control terminals 74 and 74' by a source 75. Like components of FIGS. 3 and 4 have been given the same reference characters. The main distinction between the apparatus and circuits of FIGS. 3 and 4 is that in the apparatus of FIG. 4 the parallel circuits 52 and 58 have been so interconnected with the supply terminals 32 and 32' that the magnetic core members 16 and 16' are gated during the same half-cycle of operation and the magnetic core members 40 and 40' are reset during this same half-cycle of operation. In addition, the load 72 is connected across the output diagonal of a Wheatstone bridge circuit 76.

The Wheatstone bridge circuit 76 includes two gate windings 78 and 80 which are disposed in inductive relationship with the magnetic core member 40 and two gate windings 82 and 84 which are disposed in inductive relationship with the magnetic core member 40'. Supply terminals 86 and 86', which are connected to a source 87 of alternating supply voltage which has sufficient internal impedance to limit the flow of current through the gate windings 78, 80, 82 and 84 when both of the magnetic core members 40 and 40' are in the saturated state, are connected to the input diagonal of the Wheatstone bridge 76. In practice, the alternating supply voltage applied to the supply terminals 86 and 86' is of the same frequency as the supply voltage applied to the supply terminals 32 and 32', and these supply voltages are so synchronized that when the supply terminal 32' is at a positive polarity with respect to the supply terminal 32, the supply terminal 86' is at a positive polarity with respect to the supply terminal 86.

As illustrated, the first leg of the Wheatstone bridge 76 includes the gate winding 80 and a series connected rectifier 88; on the other hand, the second leg of the Wheatstone bridge 76 includes the gate winding 84 and a series connected rectifier 90 while the third leg of the bridge 76 includes the gate winding 78 and a series connected rectifier 92, and the fourth leg of the bridge 76 includes the gate winding 82 and a series connected rectifier 94.

In order to effect a biasing of the magnetic core member 16 the reset winding 18 is connected in series circuit relationship with a rectifier 96 and with a biasing resistor 98, the series circuit being connected across the supply terminals 32 and 32'. In like manner, in order to effect a like biasing of the magnetic core member 16', the reset winding 18' is connected in series circuit relationship with a rectifier 100 and with a biasing resistor 102, the later series circuit also being connected across the supply terminals 32 and 32'. The rectifiers 96 and 100 are so poled as to permit the flow of biasing current through the windings 18 and 18' only when the supply terminal 32 is at a positive polarity with respect to the supply terminal 32'. For the purpose of resetting the magnetic core members 16 and 16' in accordance with the control voltage applied to the control terminals 74 and 74', the control terminals 74 and 74' are interconnected, as shown in FIG. 4, with the reset windings 18 and 18'.

The operation of the magnetic amplifier 70 of FIG. 4 will now be described. Assuming the control terminal 74 is at a positive polarity with respect to the control terminal 74' and assuming further that the supply terminal 32 is at a positive polarity with respect to the supply terminal 32' and that the supply terminal 86 is at a positive polarity with respect to the supply terminal 86', then during this half-cycle of operation biasing current flows from the supply terminal 32 through the biasing resistor 98, the rectifier 96 in the forward direction, and the reset winding 18, to the supply terminal 32', to thus bias the magnetic core member 16 a predetermined amount. Simultaneously biasing current flows from the supply terminal 32 through the biasing resistor 102, the rectifier 100 in the forward direction, and the reset winding 18', to the supply terminal 32', to thereby bias the magnetic core member 16' a like amount. During this same half-cycle of operation control current flows from the control terminal 74 through the rectifier 96, the reset windings 18 and 18', and the rectifier 100, to the control terminal 74'. The control current flowing through the reset winding 18 under the assumed conditions is additive to the biasing current simultaneously flowing through the reset winding 18 and thus the additive effect of the control current sets the flux level in the magnetic core member 16 still further away from positive saturation. However, the control current flowing through the reset winding 18 opposes the biasing current flowing through the reset winding 18' and therefore the magnetic core member 16' is set to a lesser flux level below positive saturation than is the magnetic core member 16.

During this same half-cycle of operation, when the supply terminal 86 is at a positive polarity with respect to the supply terminal 86', magnetizing current flows from the supply terminal 86 through the four legs of the Wheatstone bridge 76. However, since the magnetic core member 40', during the previous half-cycle of operation, was reset to a lower level below positive saturation than was the magnetic core member 40, the magnetic core member 40' saturates before the magnetic core member 40, and therefore load current flows from the supply terminal 86 through the gate winding 82, the rectifier 94 in the forward direction, the load 72, the rectifier 90 in the forward direction, and the gate winding 84, to the supply terminal 86'. Finally, during this same half-cycle of operation, when the supply terminal 32 is at a positive polarity with respect to the supply terminal 32', the magnetic core member 40 saturates and then current also flows through the gate windings 78 and 80 of the magnetic core member 40, to thereby reduce the voltage across the load 72 to substantially zero value. Thus, current flows from right to left through the load 72, as shown, when the control terminal 74 is at a positive polarity with respect to control terminal 74' and the supply terminal 32 is at a positive polarity with respect to the supply terminal 32'. However, as hereinbefore explained, this flow of load current through the load 72 occurs only between the time that the magnetic core member 40' saturates and the time that the magnetic core member 40 saturates.

During the next half-cycle of operation, when the supply terminal 32' is at a positive polarity with respect to the supply terminal 32 and the supply terminal 86' is at a positive polarity with respect to the supply terminal 86, current flows from the supply terminal 32′ through both branches of the parallel circuit 52 and the current-limiting resistor 30 to the supply terminal 32, to thereby effect a gating of the magnetic core member 16 and a resetting of the magnetic core member 40 in accordance with the value to which the magnetic core member 16 has been reset during the previous half-cycle. Simultaneously, current flows from the supply terminal 32′ through both branches of the parallel circuit 58 and the current-limiting resistor 60, to the supply terminal 32, to thus effect a gating of the magnetic core member 16′ and a resetting of the magnetic core member 40′ in accordance with the flux level to which the magnetic core member 16′ had been reset during the previous half-cycle of operation.

Assuming the polarity of the control voltage applied to the control terminal 74 and 74′ reverses so that the control terminal 74′ is at a positive polarity with respect to the control terminal 74, then during that half-cycle of operation when the supply terminal 32 is at a positive polarity with respect to the supply terminal 32′, the control current flowing from the control terminal 74′ through the reset winding 18′ is additive to the biasing current flowing therethrough while the control current flowing from the control terminal 74′ through the reset winding 18 is subtractive from the biasing current flowing through the reset winding 18, and therefore the magnetic core member 16′ under the latter assumed conditions, is reset to a flux level further below positive saturation than is the magnetic core member 16. Such being the case, during this half-cycle of operation when the supply terminal 86 is at a positive polarity with respect to the supply terminal 86′, the magnetic core member 40 saturates before the magnetic core member 40′ and during this interval between the saturation of the magnetic core members 40 and 40′ load current flows from the supply terminal 86 through the gate winding 80, the rectifier 88 in the forward direction, the load 72, the rectifier 92 in the forward direction, and the gate winding 78, to the supply terminal 86′. Therefore, when the control terminal 74′ is at a positive polarity with respect to the control terminal 74, load current flows from left to right through the load 72, as shown.

During the next half-cycle of operation when the supply terminal 32′ is at a positive polarity with respect to the supply terminal 32, current flows from the supply terminal 32′ through both branches of the parallel circuit 52 and the current-limiting resistor 30, to the supply terminal 32, to thereby effect a gating of the magnetic core member 16 and a resetting of the magnetic core member 40 in accordance with the value to which the magnetic core member 16 has been reset during the previous half-cycle of operation. At the same time, current flows from the supply terminal 32′ through both branches of the parallel circuit 58 and the current-limiting resistor 60, to the supply terminal 32, to thus effect a gating of the magnetic core member 16′ and a resetting of the magnetic core member 40′ in accordance with the value to which the magnetic core member 16′ had been reset during the previous half-cycle of operation.

The magnetic amplifier 70 of FIG. 4 also has the same advantages over the prior art as does the magnetic amplifier 36 of FIG. 2.

Referring to FIG. 5 there is illustrated a full-wave magnetic amplifier 104 embodying further teachings of this invention in which positive feedback is provided for the magnetic amplifier. In operation, the magnetic amplifier 104 effects alternating voltage across a load 106, the magnitude of which varies in accordance with the magnitude of a non-reversible polarity direct-current control voltage applied to control terminals 108 and 108′ by a source 109.

In general, the magnetic amplifier 104 comprises magnetic core members 110 and 112 which have disposed in inductive relationship therewith a reset winding 114, a feedback winding 116 and a gate winding 124, and a reset winding 120, a feedback winding 122 and a gate winding 124, respectively, and supply terminals 126 and 126′ which are adapted to have connected thereto a source 127 of alternating supply voltage. As illustrated, the load 106, which also functions as a current limiter, is connected in series circuit relationship with a parallel circuit 128, the series circuit being connected across the supply terminals 126 and 126′. One branch of the parallel circuit 128 includes the gate winding 118 and a rectifier 130 and the other branch of the parallel circuit 128 includes the feedback winding 122, a rectifier 132, and an adjustable resistor 134 which can be adjusted to vary the amount of feedback to the magnetic core member 112. The rectifiers 130 and 132 are so poled as to permit, only when the supply terminal 126′ is at a positive polarity with respect to the supply terminal 126, the flow of current from the source 127 through both branches of the parallel circuit 128. In like manner, the load 106 is connected in series circuit relationship with respect to a parallel circuit 136, the series circuit being connected across the supply terminals 126 and 126′. One branch of the parallel circuit 136 includes the gate winding 124 and a rectifier 138 and the other branch of the parallel circuit 136 includes the feedback winding 116, a rectifier 140, and an adjustable resistor 142 which can be adjusted to vary the amount of feedback to the magnetic core member 110. The rectifiers 138 and 140 are so poled as to permit, only when the supply terminal 126 is at a positive polarity with respect to the supply terminal 126′, the flow of current from the source 127 through both branches of the parallel circuit 136.

In order to alternately reset the magnetic core members 110 and 112 in accordance with the control voltage applied to the control terminals 108 and 108′, the reset windings 114 and 120 are connected in series circuit relationship with a current-limiting resistor 144, the series circuit being connected across the control terminals 108 and 108′.

The operation of the magnetic amplifier 104 of FIG. 5 will now be described. Assuming the supply terminal 126′ is at a positive polarity with respect to the supply terminal 126, then current flows from the supply terminal 126′ through both branches of the parallel circuit 128 and the load 106, to the supply terminal 126, to thus effect a gating of the magnetic core member 110 and a feedback to the magnetic core member 112 until the magnetic core member 110 saturates. Thus, the amount of feedback to the magnetic core member 112 is in accordance with the amount that the magnetic core member 110 has been reset during the previous half-cycle of operation. During the same half-cycle of operation, when the supply terminal 126′ is at a positive polarity with respect to the supply terminal 126, current flows from the control terminal 108 through the current-limiting resistor 144 and the reset windings 114 and 120, to thus effect a resetting of the magnetic core member 112 during this half-cycle of operation in accordance with the magnitude of the control signal applied to the control terminals 108 and 108′. With the feedback winding 122 wound as shown, the current flow through the feedback winding 122 effects a flux which is additive to the flux produced by the current flow through the reset winding 120, to thereby effect positive feedback. During this half-cycle of operation the rectifier 138 prevents a gating of the magnetic core member 112 and the rectifier 140 prevents a feedback to the magnetic core member 110.

During the next half-cycle of operation, when the supply terminal 126 is at a positive polarity with respect to the supply terminal 126, current flows from the supply terminal 126 through the load 106 and both branches of the parallel circuit 136, to the supply terminal 126', to thereby effect a gating of the magnetic core member 112 and a feedback to the magnetic core member 110 until the magnetic core member 112 saturates. At the same time, control current flows from the control terminal 108 through the current-limiting resistor 114 and the reset windings 114 and 120, to effect a resetting of the flux level in the magnetic core member 110 in accordance with the magnitude of the control voltage applied to the control terminals 108 and 108'. With the feedback winding 116 wound as shown, the current flow through the feedback winding 116 effects a flux in the magnetic core member 110 that is additive to the flux produced by the control current flowing through the reset winding 114, to thereby effect positive feedback. During this latter half-cycle of operation the rectifier 130 prevents a gating of the magnetic core member 110 and the rectifier 132 prevents a feedback to the magnetic core member 112.

Referring to FIG. 6A there is shown a graph illustrating a transfer curve 150 for the magnetic amplifier 104, of FIG. 5, when positive feedback is provided. It is to be noted that with no control signal input to the magnetic amplifier 104 the output voltage of the magnetic amplifier can be at cut-off. In contrast, a transfer curve 152, in FIG. 6B, represents the transfer curve for a conventional self-saturating magnetic amplifier (not shown) having positive feedback. Here it is to be noted that with no control signal input to this prior art magnetic amplifier (not shown) the output voltage of the magnetic amplifier (not shown) is at the saturating value.

Negative feedback for the magnetic amplifier 104 can be provided by merely reversing the way in which the feedback windings 116 and 122 are wound on their respective magnetic core members 110 and 112. A transfer curve 154, in FIG. 6A, represents the transfer curve for the magnetic amplifier of FIG. 5 when it is provided with negative feedback. It is to be noted that when negative feedback is provided for the magnetic amplifier of FIG. 5 and there is no control signal input, the output voltage of the magnetic amplifier can remain at the saturated value. In contrast a transfer curve 156, in FIG. 6B, represents the transfer curve for a conventional self-saturating magnetic amplifier (not shown) when it is provided with negative feedback. Thus, in the case of the conventional self-saturating magnetic amplifier (not shown) with negative feedback, the output voltage cannot remain at the saturated value with no signal input to the amplifier (not shown). In FIG. 6A a curve 158 represents the transfer curve for the magnetic amplifier 104, of FIG. 5 when it is not provided with feedback. On the other hand, a curve 160, of FIG. 6B, represents the transfer curve for a conventional self-saturating magnetic amplifier (not shown) when it is not provided with feedback.

It is to be understood that a three-legged magnetic core member (not shown) could be substituted for the magnetic core members 16 and 16' of FIG. 3. It is also to be understood that in the magnetic amplifiers shown in FIGS. 2 through 4 the two alternating supply voltages could be, and normally would be, obtained from a voltage transformer (not shown) having two secondary windings. It is further to be understood that the reversible polarity direct-current control source 75, of FIG. 4, could be replaced by a reversible-phase alternating control source (not shown) synchronized with and of the same frequency as the supply source 33. It is also to be understood that an alternating control source (not shown) could be substituted for the direct-current control source 13, of FIGS. 1 and 2, provided the polarity of the output of the alternating control source (not shown) is the same as that of the source 13 during the reset half-cycle of operation when the magnetic core member 16 is being reset.

Since numerous changes may be made in the above apparatus and circuits, and different embodiments may be made without departing from the spirit and scope thereof, it is intended that all matter contained in the foregoing description or shown in the accompanying drawings shall be interpreted as illustrative and not in a limiting sense.

I claim as my invention:

1. In a full-wave magnetic amplifier adapted to be connected to a source of alternating voltage to effect a voltage across a load, the combination comprising, magnetic core means, two gate windings and two feedback windings disposed in inductive relationship with the magnetic core means, circuit means for connecting said load and a first parallel circuit in series circuit relationship with respect to said source, one branch of said first parallel circuit including a first rectifier and one of the two gate windings and the other branch of said first parallel circuit including a second rectifier and one of the two feedback windings, other circuit means for connecting said load and a second parallel circuit in series circuit relationship with respect to said source, one branch of said second parallel circuit including a third rectifier and the other of the two gate windings and the other branch of said second parallel circuit including a fourth rectifier and the other of the two feedback windings, said four rectifiers being so poled as to permit, only during alternate half-cycles of the output of said source, the flow of current from said source through said load and said first parallel circuit and as to permit, only during the other alternate half-cycles of the output of said source, the flow of current from said source through said load and said second parallel circuit so as to effect an alternating voltage across said load, and means for resetting the flux level in said magnetic core means in accordance with a control signal.

2. In a full-wave magnetic amplifier adapted to be connected to a source of alternating voltage to effect a voltage across a load, the combination comprising, a first magnetic core member having a gate winding and a feedback winding disposed in inductive relationship therewith, a second magnetic core member having a gate winding and a feedback winding disposed in inductive relationship therewith, circuit means for connecting said load and a first parallel circuit in series circuit relationship with respect to said source, one branch of said first parallel circuit including a first rectifier and the gate winding of the first magnetic core member and the other branch of said first parallel circuit including a second rectifier and the feedback winding of said second magnetic core member, other circuit means for connecting said load and a second parallel circuit in series circuit relationship with respect to said source, one branch of said second parallel circuit including a third rectifier and the gate winding of said second magnetic core member and the other branch of said second parallel circuit including a fourth rectifier and the feedback winding of said first magnetic core member, said four rectifiers being so poled as to permit, only during alternate half-cycles of the output of said source, the flow of current from said source through said load and said first parallel circuit and as to permit, only during the other alternate half-cycles of the output of source, the flow of current from said source through said load and said second parallel circuit so as to effect an alternating voltage across said load, and means for resetting the flux level in said first magnetic core member and in said second magnetic core member in accordance with a control signal.

References Cited in the file of this patent

UNITED STATES PATENTS 2,942,175 Wright ________________ June 21, 1960